(12) United States Patent
Stewart et al.

(10) Patent No.: US 7,520,430 B1
(45) Date of Patent: Apr. 21, 2009

(54) MULTISERVICE MERCHANT GATEWAY

(75) Inventors: Brett B. Stewart, Austin, TX (US); Charles O. Golson, Austin, TX (US)

(73) Assignee: Acumera, Inc., Austin, TX (US)

( * ) Notice: Subject to any disclaimer, the term of this patent is extended or adjusted under 35 U.S.C. 154(b) by 0 days.

(21) Appl. No.: 11/267,566

(22) Filed: Nov. 4, 2005

Related U.S. Application Data

(60) Provisional application No. 60/625,044, filed on Nov. 4, 2004.

(51) Int. Cl.
*G06K 15/00* (2006.01)
*H04J 3/16* (2006.01)
*H04J 3/22* (2006.01)

(52) U.S. Cl. .......................... 235/383; 705/39; 705/40; 705/42; 705/44; 370/466

(58) Field of Classification Search ................. 235/380, 235/379, 383, 472.01; 705/26–27, 35, 39–45, 705/14–16; 370/466
See application file for complete search history.

(56) References Cited

U.S. PATENT DOCUMENTS

| | | | |
|---|---|---|---|
| 5,898,594 A * | 4/1999 | Leason et al. ............... 700/231 |
| 7,155,405 B2 * | 12/2006 | Petrovich ...................... 705/26 |
| 7,225,253 B2 * | 5/2007 | Ofir et al. .................... 709/224 |
| 2002/0046185 A1 * | 4/2002 | Villart et al. .................. 705/64 |
| 2002/0051463 A1 * | 5/2002 | Higuchi ...................... 370/466 |
| 2002/0077889 A1 * | 6/2002 | Kolls ........................... 705/14 |
| 2002/0099607 A1 * | 7/2002 | Sosa et al. .................... 705/14 |
| 2002/0107791 A1 * | 8/2002 | Nobrega et al. ............... 705/39 |
| 2003/0137991 A1 * | 7/2003 | Doshi et al. ................. 370/466 |
| 2003/0229546 A1 * | 12/2003 | Ho ............................... 705/26 |
| 2006/0237528 A1 * | 10/2006 | Bishop et al. ............... 235/380 |
| 2007/0185991 A1 * | 8/2007 | Ofir et al. .................... 709/224 |

* cited by examiner

*Primary Examiner*—Thien M. Le
*Assistant Examiner*—Tuyen K Vo
(74) *Attorney, Agent, or Firm*—Campbell Stephenson LLP

(57) ABSTRACT

A multiservice merchant gateway (MMG) allows point of sale terminals and other devices to be interfaced with a wide area network, thereby improving speed and service to terminal owners and users, allowing for more efficient systems on merchant premises, and also allowing the merchant to provide and/or utilize various additional features and services. Support infrastructure for configuring MMGs, managing MMGs, and providing related services are also disclosed.

40 Claims, 9 Drawing Sheets

MULTISERVICE MERCHANT GATEWAY

This application claims the benefit, under 35 U.S.C. § 119 (e), of U.S. Provisional Application No. 60/625,044, filed Nov. 4, 2004, entitled "Multiservice Merchant Gateway," and naming Brett Stewart and Charles Golson as inventors. The above-referenced application is hereby incorporated by reference herein in their entirety.

BACKGROUND OF THE INVENTION

1. Field of the Invention

The present invention relates in general to devices used by merchants for transaction processing, record keeping, and related reporting, and more particularly to such devices that provide additional features and services for use by merchants and their customers.

2. Description of the Related Art

Point of sale (or sometimes "point of service," POS) terminals are used extensively by merchants of goods and services to facilitate the capture, authorization, and processing transactions with consumers in a quick and efficient manner. In the simplest example, a POS terminal is an electronic device placed in a merchant location, and connected to a financial institution's payment system or authorization service provider via some communication network, typically the public switched telephone network (PSTN). POS terminals are designed to authorize, record, and forward data for each sale by electronic means. Moreover, such terminals include a variety of different features, and are used by numerous different types of users including financial institutions, merchants, service providers, non-profit organizations, and government agencies. Although the typical POS terminal is designed to process credit card and debit card transactions, many POS terminal devices can process transactions associated with checks, smart cards, gift cards, ATM cards, and automatic withdrawal of funds (e.g., automated clearing house (ACH) and electronic finds transfer (EFT) transactions). Moreover, POS terminals exist in a variety of different form-factors including countertop devices, terminals integrated into other devices (e.g., a gasoline pump), stand-alone payment terminals models, and portable devices.

FIG. 1 illustrates a simplified block diagram of a prior art POS transaction system 100. POS terminal 100 is coupled to a communications network 130 so that it can communicate with transaction processor 140. In a typical example, communication network 130 is a public switched telephone network (PSTN). Because POS terminal 110 utilizes a conventional telephone line, it can be designed to provide pass through connection to the phone line for other devices such as telephone 120. In still other examples, devices that use PSTN 130 are separately connected to the network.

POS terminal 110 is generally capable of reading a credit or debit card with a magnetic card reader, displaying information about the transaction, receiving input information regarding the amount of a transaction and/or PIN numbers, constructing an authorization message, and dialing a predetermined destination over a conventional telephone line (e.g., PSTN 130) to communicate with a transaction processor 140 to thereby authorize a particular transaction. Transaction processor 140 is typically one or more specialized computer systems provided by service providers and/or financial institutions to review and authorize or reject proposed transactions. A suitable message is sent back to POS terminal 110 (e.g., an authorization message) indicating whether or not the transaction can be completed. Once a transaction is completed, POS terminal 110 may print a record of the transaction (e.g., a receipt), and either stores transaction information locally (e.g., in a terminal memory) or can also transmit another message to transaction processor 140 (or some other computer system not shown) where information relating to the transaction is stored. At the end of some business cycle, e.g., the end of a business day, POS terminal 110 again contacts transaction processor 140 to reconcile daily the day's transactions so that the records maintained by the merchant correspond with the records maintained at transaction processor 140.

Despite extensive development of POS terminal technology and inclusion of many different features in the devices, POS terminals can be limited by the communication network used to contact service providers and/or financial institutions that provide transaction authorization and processing. FIG. 2 illustrates a simplified timing diagram describing an example of a transaction initiated via a conventional POS terminal. In FIG. 2, various segments of the overall transaction are shown, with the approximate time taken for each transaction segment indicated by the individual traces. The first trace, Hook Switch, roughly illustrates the total time for transaction processing as seen from the POS terminal. Thus, the merchant time is approximately 15 seconds from beginning to end. The transaction begins with the POS terminal going off hook, and its modem detecting the PSTN dial tone. Once detected, a DTMF (dual-tone, multi-frequency) signal is generated to dial the transaction processor computer. Next, a PSTN delay occurs, approximately 5.75 seconds. This delay includes routing the call through the PSTN network, and any delays on the transaction processor side in answering the call. Once the transaction processor's modem answers the call, a modem training period occurs. In the example illustrated, the training corresponds to the Bell 212A 1200 bps transmission protocol. Numerous other transmission protocols, e.g., V.22, V.22bis, V.23, etc., can be used. Once the modem training process is complete, the POS terminal transmits one or more transfer protocol data units (TPDUs) to the transaction processor (TPDU Up). There is some delay as the transaction server performs operations needed to authorize the transaction, and here the delay is shown to be 1.75 seconds, but can vary from instance to instance. Finally, the transaction processor transmits one or more TPDUs to the POS terminal, where the TPDUs include authorization information. As shown, the transaction processor sees a transaction that is approximately 6 seconds ("Message Units").

Although such systems may be adequate for many situations, FIG. 2 illustrates one significant source of delay, routing the call through the PSTN. Moreover, using conventional POS terminal devices in this manner requires a dedicated phone line which carries an associated cost. Because the phone line needs to be available for POS terminal transactions, it is often desirable to have a phone line dedicated specifically for the POS terminal, and thus much of the phone line's utility is wasted because it cannot be used for other services such as conventional voice traffic, facsimile traffic, or to support other POS terminals. From the point of view of the transaction service provider, PSTN communication can also be costly. Such service providers typically need to support numerous telephone lines, and use specialized equipment to handle POS terminal calls.

In view of the highly cost competitive environment in which POS terminals are currently used and cost sensitivity of many merchants, it is desirable to have POS terminals and devices used to support POS terminals that allow for more efficient use of communication resources and provide cost savings to both merchants and service providers.

SUMMARY OF THE INVENTION

A multiservice merchant gateway (MMG) is disclosed. The MMG allows point of sale terminals and other devices to be interfaced with a wide area network, thereby improving speed and service to terminal owners and users, allowing for more efficient systems on merchant premises, and also allowing the merchant to provide and/or utilize various additional features and services. Support infrastructure for configuring MMGs, managing MMGs, and providing related services are also disclosed.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Although the description below emphasizes systems, methods, apparatus and software for use by merchants in business activities, the actual types of users and their activities are intended to be very broadly defined. Thus, the term "merchant" will be used to include anyone who processes some sort of payment, processes transactions, records information related to the merchant's endeavors, and or reports information related to the merchant's endeavors using devices such as point-of-sale terminals or other data terminals. More specific examples of these activities include: obtaining transaction authorization, obtaining other transaction related information, recording/reporting information in association with some business or governmental requirement (e.g., inventory control, accounting, customer surveys, legal compliance, etc.), providing products or services (e.g., vending, gaming, information access, etc.), and the like. The merchant might be affiliated with a for-profit business, or instead be affiliated with a non-profit organization, an educational organization, a governmental organization, or a political organization. Moreover, the type of transaction involved can include traditional sales transactions, as well as numerous other types of transactions including various of financial transactions such as returns, credits, balance inquiries, funds transfers, donations, and the like. Similarly, the term "point of sale terminal" can refer to various devices used to initiate and/or conclude some type of related transaction, information gathering or reporting, or product/service provision, such as ATMs, kiosks, vending machines, hand-held data terminals, gaming machines, PCs, and the like. Accordingly, the terms merchant and POS terminal/transaction/etc should be given their broadest meaning in keeping with the description above.

Figure 1:
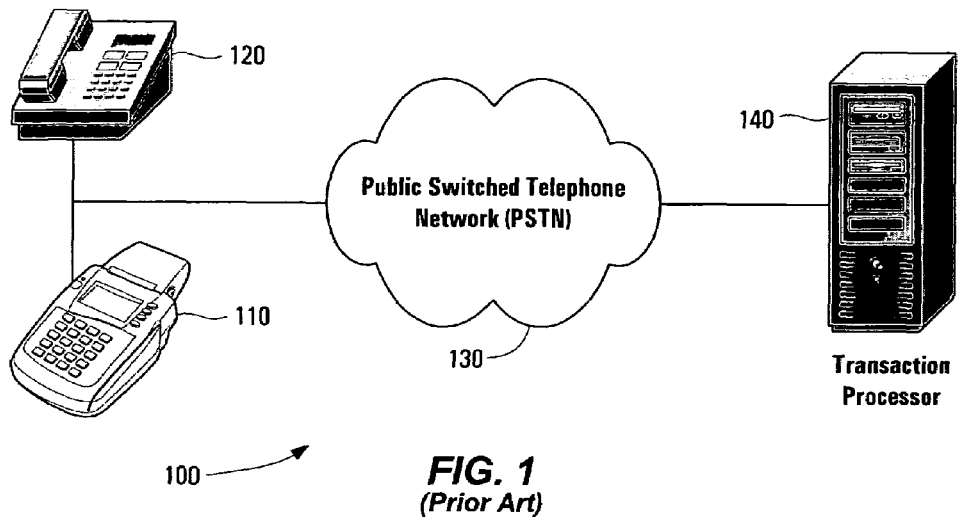
FIG. 1 illustrates a simplified block diagram of a prior art POS transaction system.
Figure 3:
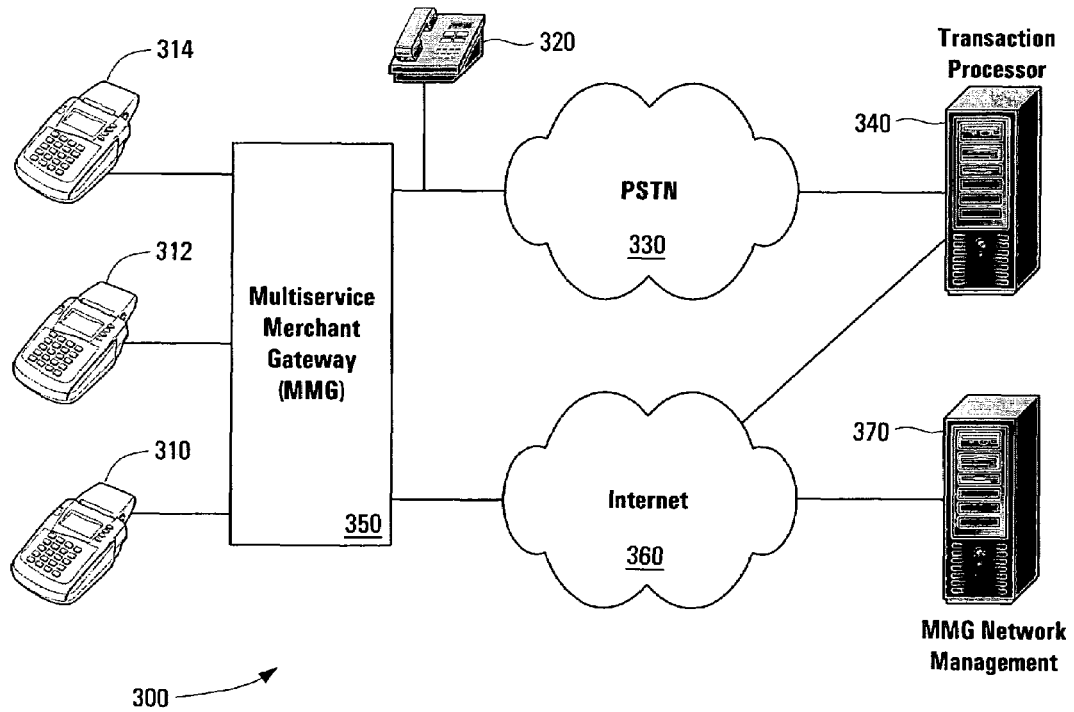
FIG. 3 illustrates a simplified block diagram of a POS transaction system in accordance with an embodiment of the present invention.

FIG. 3 illustrates a simplified block diagram of a POS transaction system 300 in accordance with an embodiment of the present invention. One or more POS terminals 310-314 are coupled to multiservice merchant gateway (MMG) 350, which in turn is coupled to both PSTN 330, and another communications network 360 such as LANs, MANs, or WANs. In many embodiments, network 360 is the Internet. Functionality of and services provided by MMG 350 are managed, at least in part, by MMG network management server 370. One or more transaction processors 340 are specialized computer systems provided by service providers and/or financial institutions to review and authorize or reject proposed transactions. In system 300, transaction processor 340 is coupled to both PSTN 330 and Internet 360, so that it can process transactions communicated to it over one or both of the networks. Note that although transaction processor 340 is illustrated as a single device, in some embodiments of the present invention separate transaction processors will exist for transactions via PSTN 330 and Internet 360, respectively. MMG 350 serves as a gateway for the various POS terminals 310-314 to transact over the Internet (and potentially over PSTN 330) as described below. Additionally, MMG 350 is further configured to support various POS terminal peripherals (not shown) such as PIN keypads, printers, check readers, smart card readers, bar code readers, RFID readers, and the like. Since many POS terminals are designed to provide pass-through connection to the PSTN for telephones, telephone 320 is shown separately connected to PSTN 330. In other embodiments, MMG 350 can be configured to provide such pass-through access, and telephone 320 will be coupled directly to MMG 350.

In general, MMG 350 provides merchants a means to migrate legacy transaction terminals and POS equipment onto a broadband network without modification or substantial reprogramming. MMG 350 operates as an interface device installed on the merchant premises and connecting, on the one hand, existing transaction terminals, and on the other hand, a broadband network. Additionally, a failsafe PSTN dial connection can be utilized to assure continuity of transaction processing in the case of broadband network unavailability. MMG 350 provides a PSTN dial tone indistinguishable from that of a PSTN central office, but contains the modems locally on the merchant premises, thereby allowing the POS terminals to be operated as though they were permanently dialed in and connected. Modem training time, telephony circuit setup time and other delays inherent in transaction networks are thereby reduced or eliminated. Telephony costs are also reduced or eliminated. MMG 350, being connected to a broadband network, is also able to offer additional benefits to the merchant. For example, other modem-based or serial-based devices (such as ATMs, timecard devices, and security systems, for example) can be permanently connected in precisely the same manner as transaction terminals. High speed Internet access can be provided to the merchant to either a single computer or to a local area network on the merchant premises. Virtual private networks can be established between multiple merchant sites. In appropriate cases, broadband Internet access can be offered to the merchant's customers. MMG 350 exchanges transaction messages with one or more service provider network addresses, providing both a degree of reliability through redundancy and self-balancing loads for busy transaction processing destinations. Communications are secured using a variety of techniques such as encryption, industry standard X.509 certificates for authenticity, and SSL for security. MMG 350 is managed across the broadband network connection by an MMG network management provider, e.g., 370.

Figure 4:
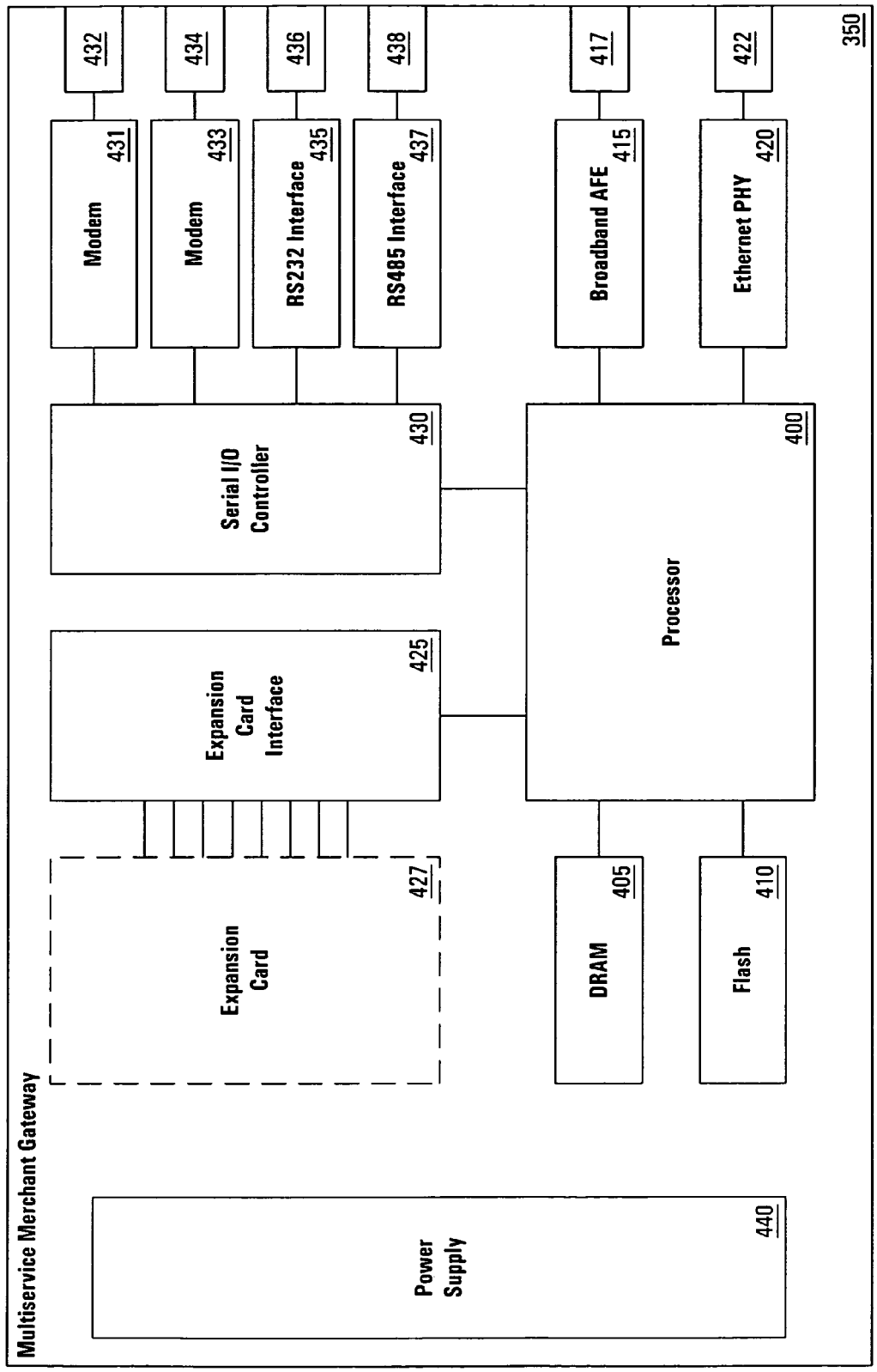
FIG. 4 illustrates a simplified block diagram of a multiservice merchant gateway (MMG) in accordance with an embodiment of the present invention.

FIG. 4 illustrates a simplified block diagram of a multiservice merchant gateway (MMG) in accordance with an embodiment of the present invention. Note that the components and arrangement shown in FIG. 4 is merely illustrative, and various similar embodiments are contemplated.

At the heart of MMG 350 is processor 400. Processor 400 can be implemented using a variety of different general purpose microprocessors, embedded processors, network processors, system-on-a-chip (SoC) devices, ASICs, FPGAs, and the like. Processor 400 executes various programs that enable MMG functionality such as the MMG operating system, MMG control software, POS terminal control software, security software, etc. In some embodiments, MMG 350 is used by a merchant with existing broadband (or other WAN connectivity) hardware, such as DSL and cable modems. In other embodiments, processor 400 is configured (using software and/or specialized circuitry) to provide broadband connectivity. For example, processor 400 can be a highly integrated, monolithic, single chip network processor designed for use as part of customer premise equipment (CPE) modems. Thus, processor 400 can include (not shown) a CPU subsystem providing the processor core, instruction cache, data cache, a memory management unit (MMU), timers, an interrupt controller, GPIO lines, UART circuitry, etc. The CPU subsystem typically handles all the routing/configuration and control operations. Processor 400 can also include: a hardware based buffer allocation engine to accelerate packet transfer from WAN to LAN; an ADSL discrete multitone (DMT) hardware engine for processing data at the DSL physical and transmission convergence layers according to DSL standards; a DRAM controller providing access to high-bandwidth, high-capacity bulk volatile memory used for program and data storage; an Ethernet controller (MAC); and one or more external bus bridges providing an interface between processor 400 and external storage devices like flash memory or external peripheral devices such as DSPs and expansion cards (e.g., Mini PCI and PCMCIA). An example of such a network processor is the AR900/AR901/AR902/AR922/AR942 family of network processors from LSI Logic Corporation of Milpitas, Calif. Numerous other processors can be used as will be known to those having ordinary skill in the art.

Thus, processor 400 is coupled to volatile memory (DRAM 405) via a suitable memory controller. Similarly, processor 400 is coupled to nonvolatile memory (Flash 405) via a bus such as the aforementioned external bus bridge. Flash memory 410 provides useful nonvolatile storage for software, configuration information, and other MMG data. For MMG implementations with built-in broadband capability, processor 400 is coupled to broadband analog front-end (AFE) 415. In general, AFEs include pure analog and mixed digital and analog circuitry, and are responsible for several tasks including: signal capture, analog domain filtering and handoffs to an analog to digital converter (ADC) in one direction as well as conversion from the digital to the analog domain by a digital to analog converter, and analog filtering and power amplification in the other direction. AFE integrated circuits can also include other circuits such as line drivers, transformers, drive circuits for voltage controlled crystal oscillator (VCXO), digitally-controlled crystal oscillator (DCXO), and phase locked loop (PLL) circuits. In one embodiment, AFE 415 is an AR8202 ADSL AFE provided by LSI Logic Corporation of Milpitas, Calif. This device is a highly integrated AFE designed to perform all of the analog functions of the receive (RX) and transmit (TX) paths for ADSL customer premise modems. Numerous other AFE integrated circuits can be used as will be known to those having ordinary skill in the art. In turn, broadband AFE 415 is coupled to a suitable connector 417, such as an RJ-14 connector for DSL based MMGs.

Processor 400 is also coupled to Ethernet PHY 420, which in turn is coupled to a suitable connector (422) such as an RJ-45 connector. These components provide connection to an external broadband device (e.g., an external DSL or cable modem) as well as a LAN connection for other devices using a broadband connection maintained by the broadband modem internal to MMG 350. Such a LAN connection can be used, for example, to support a merchant's back office LAN or to provide a wired LAN connection for customers.

MMG 350 includes one or more expansion card interfaces 425, allowing for convenient expandability of the devices capabilities via expansion cards 427. Expansion card interface 425 is coupled to processor 400 over an appropriate data bus, and can be selected to accommodate expansion cards that are accessible either internal to or external to MMG 350. For example, if expansion card interface 425 provides a mini-PCI connector and/or interface circuit, expansion card 427 will typically be a mini-PCI board that can only be installed/removed by opening the enclosure for MMG 350. Such an operation will typically be limited to the manufacturer and experienced technicians. Alternately, expansion card interface 425 can provide a connector and/or interface circuit for expansion cards designed to be inserted and removed by regular users. Such expansion cards can include smart cards, PCMCIA cards, flash memory cards (compact flash, SD, miniSD, MultiMediaCard, Memory Stick, etc.), and the like. Using various different expansion cards, different functionality and capabilities can be added to MMG 350. For example, an IEEE 802.11a/b/g compatible wireless LAN PCMCIA card can provide various users (e.g., the merchant or customers of the merchant) wireless access to the Internet.

As will be described below, various types of programs can be executed by MMG 350 to manage access to such services. In general, numerous other services and capabilities can be provided via the MMG's expansion card feature.

Since MMG 350 is designed to interface with one or more POS terminals, various interfaces (431-437) and corresponding connectors (432-438) are provided. Interfaces 431-437 are controlled by serial I/O controller 430, which is coupled to processor 400. In general, each channel of serial I/O controller 430 manages one interface, and performs serial-to-parallel conversion on data characters received from peripheral devices or modems and parallel-to-serial conversion on data characters transmitted by the processor 400. Status information for each channel of the can be provided to processor 400 during operation, and such information typically includes the type and condition of the operation performed and any error conditions encountered. An example of an integrated circuit that can be used as serial I/O controller 430 is the TL16C554A asynchronous-communications element from Texas Instruments, Inc., of Dallas, Tex. TL16C554A includes four UARTs based on the well known 16550 architecture. Numerous other serial I/O controllers can be used as will be known to those having ordinary skill in the art.

Since numerous different types of POS terminal interfaces exist, MMG 350 can support a variety of interfaces for POS terminal communication and connection of POS terminal peripherals (e.g., printers, PIN keypads, bar code scanners, smart card readers, check readers, etc.). At least one PSTN capable modem interface (431 or 433) will be included so that the POS terminal can communicate to MMG 350 using the means by which the POS terminal would typically communicate with a service provider, modem communication protocols such as Bell 212A, V.22, V.22bis, V.23, V.34, etc. Consequently, modems 431 and 433 provide compete modem functionality via modem chipsets that typically include, for example, a modem integrated circuit (providing DSP, serial/parallel conversion, and modem control functionality) and an integrated circuit direct access arrangement (DAA). An example of the modem chipset used for modems 431 and 433 is the SI2401 modem chipset from Silicon Laboratories, Inc. of Austin, Tex. Numerous other serial modem chipsets can be used as will be known to those having ordinary skill in the art. In still other embodiments, some of the modem functionality can be provided by software executing on processor 400, e.g., soft modem of host signal processing (HSP) functionality. Connectors 432 and 434 are typically implemented using modular telephone connectors such as RJ-11 connectors.

Figure 2:
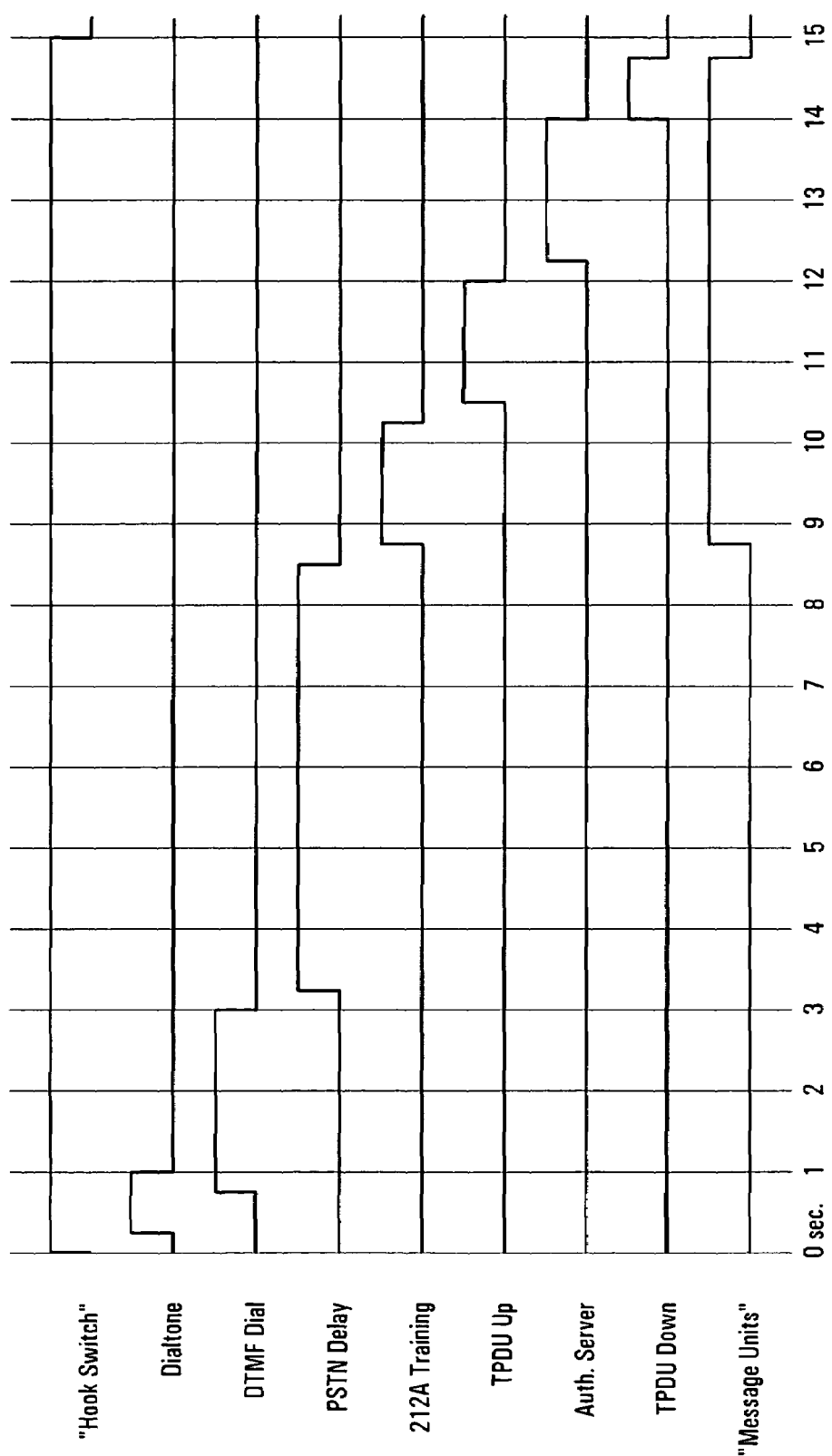
FIG. 2 illustrates a simplified timing diagram describing an example of a transaction initiated via a conventional POS terminal.

When a POS terminal is in operation, modems 431 and 433 provide the POS terminal with an accustomed communication interface, i.e., the POS terminal communicates with another modem. However, instead of the other modem being located at a service provider's site, and connected to the POS terminal via the PSTN, the other modem is part of MMG 350 and directly connected to the POS terminal. In this way, MMG 350 can intercept POS terminal transaction, forward them to a service provider via another network (e.g., the Internet), receive a response from the service provider, and reformat the response into a format for transmission via modem back to the POS terminal. Because this can generally be performed quickly, some or all of the PSTN delay time shown in FIG. 2 can be eliminated. Moreover, in some embodiments, other operations shown in FIG. 2 can be performed more quickly as well. MMG 350 can include multiple modems and corresponding connectors to accommodate multiple POS terminals. In this way, a single communication line (e.g., a single telephone line in the case of DSL) can be used to efficiently support multiple POS terminals.

In some instances, broadband network access may be unavailable, and MMG 350 is configured to accommodate one or more failsafe options for processing POS terminal transactions. For example, if processor 400 (or some other component of MMG 350) determines that broadband network access is unavailable, it can switch one or both of connectors 432 and 434 to be connected to another connector (not shown) that is coupled directly to a PSTN telephone line. Alternately, processor 400 can switch one or both of connectors 432 and 434 to be connected to connector 417 (in cases where broadband service is DSL, and therefore provided over a PSTN phone line), thereby allowing the POS terminal to communicate by passing its signals through MMG 350. In other examples, as will be described below, failsafe operation can occur when broadband network access is available, but is nevertheless undesirable or unusable (e.g., security reasons, service provider failure, etc.). Failsafe operation can be used in still other circumstances, such as power failures.

In one embodiment, upon power-up MMG 350 monitors attached phone lines that will bypassed under normal (e.g., non-failsafe) conditions. When the MMG detects recognized DTMF strings, it causes a relay (not shown) to switch and hold the phone line in a mode of "switched to terminate locally," thereby disconnecting the line from the PSTN. When any condition occurs that warrants allowing connection to the PSTN, the relay is released and the device reverts back to PSTN-based operation. Similarly, if power to the MMG fails, the device reverts back to PSTN operation by virtue of relay design. It should be noted that the MMG can also include a "watchdog timer" that will quickly reset the MMG (and thereby release the relay) if certain error conditions occur. Finally, if the MMG detects a DTMF string it does not recognize, it connects the line to the PSTN and enters a monitoring mode similar to that used at first power-up.

Interfaces 435 and 437 are shown as RS232 and RS485 interfaces, respectively. Various other serial interfaces can be included such as USB. These are shown as representative of the types of interfaces used by POS terminal peripherals such as printers, PIN keypads, bar code scanners, smart card readers, check readers, and the like. In many cases, such peripherals will be configured to interface directly with a corresponding POS terminal by connecting the peripheral to an interface on the POS terminal. However, in other embodiments POS terminals can share peripherals via MMG 350. Examples of the interface integrated circuits used for interfaces 435 and 437 include the MAX3232 and MAX3483 families of transceivers, respectively, from Maxim Integrated Products of Sunnyvale, Calif. Numerous other interface circuits can be used as will be known to those having ordinary skill in the art. Moreover, although MMG 350 is shown having two modems and two alternate interfaces, various numbers and types of interfaces can be implemented as desired or necessary.

MMG 350 typically includes a variety of other components. Power supply 440 provides well regulated power to the various integrated circuits. Numerous different power supply architectures can be implemented for power supply 440. For example, power supply 440 can be implemented as a switch mode power supply. Moreover, power supply 440 can be designed with various constraints in mind such as low power operation, low heat output, fanless operation and the like. In many embodiments, power supply 440 is designed to switch at frequencies above the DSL band to avoid self-interference. Additionally, it is generally desirable that power supply 440 be very efficient, allowing the MMG to be sealed. MMG designs using enclosure holes for ventilation are more prone to device malfunction because various material (e.g., water, dust, etc.) can penetrate the enclosure. Efficient power supplies need not use external ventilation, thereby making the device more robust.

Many other aspects of the MMG design are not illustrated, but will be known to those having ordinary skill in the art. MMG 350 will typically include one or more indicator LEDs or displays, indicating, for example, power, network connectivity, secure operation, POS terminal connectivity, MMG status, operational messages, etc. MMG 350 can be equipped with various means to indicate basic system status, such as: powered up, broadband network available, operational mode (broadband or failsafe), presence of POS terminal connections, presence of merchant client connection, activity of merchant client connection, presence/absence of VPN private connection, presence of guest client connection, and activity of guest client connection. An enclosure for the MMG can be of conventional design, or configured to have special features or to be suited for specific environments. The MMG is intended to be placed in a variety of physical environments, and does not presume the presence of an environment designed to be particularly hospitable to electronic equipment. In some embodiments, MMG enclosures will be designed to meet or exceed the requirements of various standards, such as, for example, those described in NEMA 250-1997. Thus, an example MMG enclosure is a NEMA Type 2 enclosure. MMGs may be mounted in inhospitable merchant premises environments where demarcation of telephony connections currently occur. These locations might include laundry facilities, a cool storage areas, a hot electrical equipment rooms without conditioning, in the vicinity of kitchen equipment, etc. Consequently, some embodiments of the MMG enclosure are designed to withstand a limited amount of falling water or other liquid, and MMG cabling will typically exist on a bottom surface with drip loops to prevent liquid invasion by dripping down connected cables.

In general, MMG devices are designed for relatively simple, and fairly automated, installation and configuration. Although the actual installation procedure will vary from embodiment to embodiment, many steps will be common from embodiment to embodiment. For example, since MMG devices will frequently be inserted into legacy POS systems, the installation process might include the basic sequence: determine presence of broadband service, physical MMG installation, power installation, confirm appropriate status conditions of MMG, insert MMG into POS connection, confirm appropriate status indication (e.g., presence of POS connection), and confirm POS terminal message delivery. Numerous other installation steps and variations in this basic installation sequence will be known to those having ordinary skill in the art.

Figure 5:
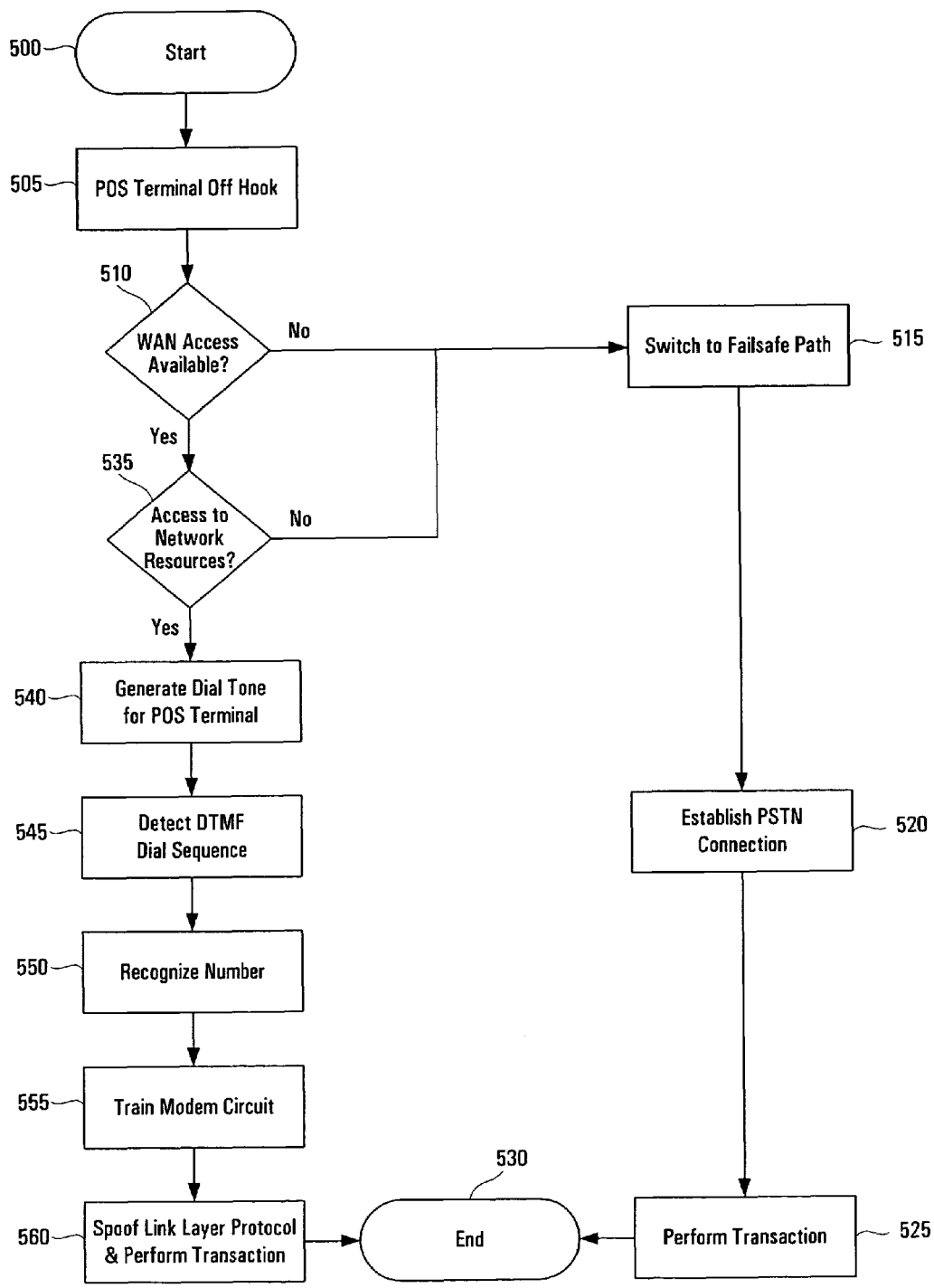
FIG. 5 is a flow chart illustrating an aspect of MMG operation in accordance with an embodiment of the present invention.

FIG. 5 is a flow chart illustrating an aspect of MMG operation in accordance with an embodiment of the present invention. Operation begins at 500, where it is assumed that an MMG is properly installed and connected to at least one POS terminal and to an appropriate WAN such as the Internet. In 505, a transaction has been entered into a POS terminal, and the POS terminal initiates its communication with a service provider by switching the state of the connection between the MMG and the POS terminal to the off hook state. The MMG detects this off hook condition, and determines whether WAN access is currently available. If not, as determined in 510, operation transfer to 515 where the MMG takes the necessary steps to switch POS terminal communication to a failsafe path, e.g., a PSTN phone line as described above. From there, a PSTN connection is established (520) between the POS terminal and a transaction service provider system, and the transaction proceeds in a conventional fashion (525) as is well known in the art. Upon transaction completion, e.g., return of an appropriate authorization message, the MMG returns to a waiting state and the process ends 530.

If WAN access is available either external to the MMG (e.g., an external DSL or cable modem) or via an internal broadband modem, as determined in 510, operation transitions to 535 where a determination is made regarding access to specific network resources. The determinations performed at 535 can include, for example, testing whether there is an adequate and/or secure connection to a transaction processor (e.g., transaction processor 340 of FIG. 3), testing whether there is an adequate and/or secure connection to an MMG network management server (e.g., server 370 of FIG. 3), and the like. If there is some condition indicating that WAN communication with a service provider should not be used, operation transfers to 515 and the above-described failsafe procedure is followed. Note that one or both of operations 510 and 535 might not be explicitly performed each time a POS terminal off hook is detected. For example, an initial determination along the lines of operation 510 can be made that puts the MMG into a failsafe mode for all POS transactions until the MMG is switched out of failsafe mode. Similarly, various network resource monitoring processes can be performed outside the illustrated flow chart, thereby placing the MMG into or out of a failsafe mode.

Once it is determined that some adequate subset of network resources are available, the MMG generates an appropriate dial tone for the POS terminal. In the example of MMG 350, such dial tone generation is typically performed by the MMG modem circuit coupled to the relevant POS terminal. However, various other devices and techniques can be used to generate the dial tone expected by the POS terminal. In response to the presence of the dial tone signal, the POS terminal will issue a DTMF dial sequence that typically includes the telephone number for a transaction service provider system. Note that in some embodiments, POS terminals can be configured to dial non-standard numbers (e.g., numbers that do not necessarily correspond to any working telephone number) merely as a way to start the transaction and/or identify which POS terminal is communicating with the MMG. In step 545, the DTMF sequence is detected by the MMG. The MMG determines (550) that the dialed number is a recognized number, e.g., an number corresponding to a service provider for which WAN based communication is acceptable. This can be performed by a simple look-up operation where the MMG has a table of authorized numbers, and associated information to be used in transmitting the transaction message to the service provider via the WAN, e.g., network address, access information, protocol information, etc. In the event that the MMG cannot confirm the number dialed by the POS terminal (not shown), an error condition may occur or operation can transition to failsafe mode.

Upon recognition of the dialed number, the modem circuit between the MMG and the POS terminal is trained according to the modem communication protocols used by the devices (555). Next, the MMG operates in a manner transparent to the POS terminal to exchange transaction information with an appropriate transaction processor provided by a service provider or financial institution (560). Thus, the MMG spoofs the link layer protocol normally used by the POS terminal, but does so in a manner that provides various benefits such as improved transaction time and reduced infrastructure costs. In performing this operation, the transaction initiated by the POS terminal is performed. Upon completion of the transaction, e.g., return of an appropriate authorization message to the POS terminal, the MMG returns to a waiting state and the process ends 530. Note that in some cases (not shown), the dialed number is not recognized, and operation returns to a waiting state. In such cases, a suitable error indication can also be generated.

Figure 6:
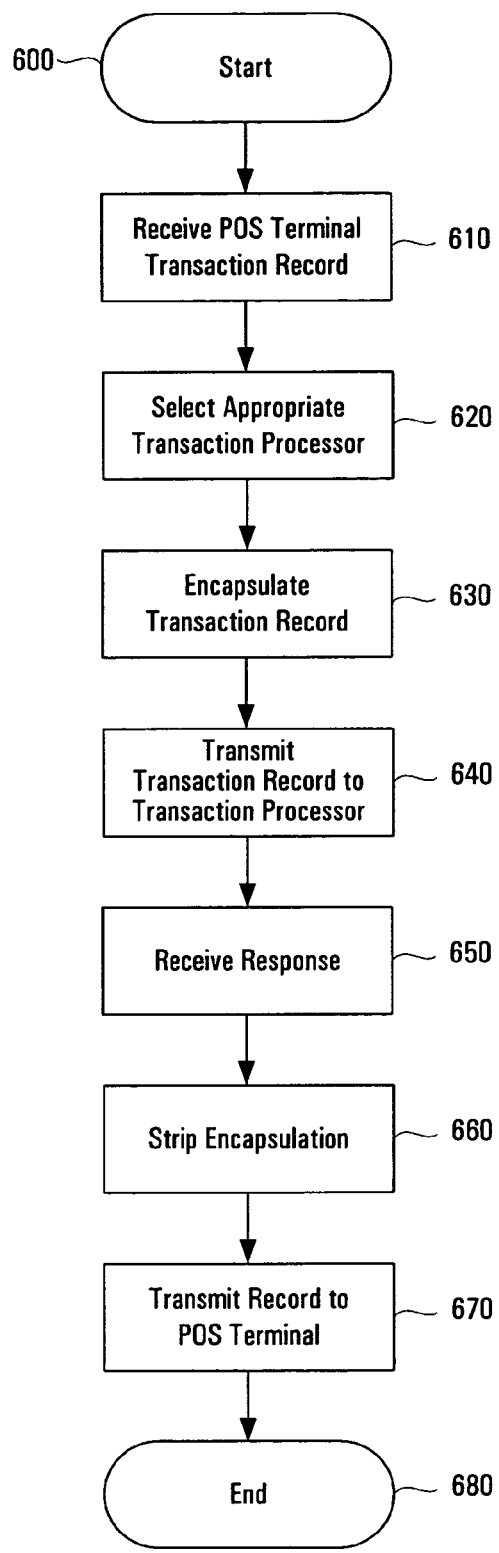
FIG. 6 is a flow chart illustrating more detailed aspects of MMG operation in accordance with an embodiment of the present invention.

FIG. 6 is a flow chart illustrating in greater detail an example of the operations performed in 560 of FIG. 5. Operation begins at 600 where it is assumed that modem training between a POS terminal and an MMG has already occurred. In step 610, the MMG receives a transaction record from the POS terminal. In general, the MMG (in conjunction with the attached WAN) operates as an alternate transport mechanism for the POS terminal message, and does not particularly require special knowledge of the internal message format of the POS terminal transaction. In the simplest case, the MMG receives the POS transaction component record, bracketed by link layer boundary and check characters, e.g., a start of text indicator, the data, and end of text indicator (ETX), and longitudinal redundancy check characters (LRC) for error detection. However, the POS transaction can use various different message formats or protocols such as VISA I, VISA II, ISO-8583, Base24, proprietary, and other message formats or protocols. In many embodiments, the transaction message will include a transport protocol data unit (TPDU) used to provide the transport addressing functions of the interface without affecting the application functions, and the protocol-based message itself, which includes financial information for the transaction. TPDUs typically include a TPDU ID, a protocol indicator, and possibly source and destination addresses. The protocol-based message typically includes a message type indicator, a bitmap, and various fields determined by the contents of the bitmap. These fields contain financial information used for the transaction.

Based on the number dialed by the POS terminal, and/or information in the transaction record received, an appropriate transaction processor is selected, 620. Various different service providers can be supported by the MMG, and so the particular transaction processor selected can depend on provider. Even for a single service provider, there can be different transaction processors selected, e.g., for load balancing purposes, depending on quality of service/cost, or depending on related finical institutions. Once selected, operation transitions to 630 where the transaction record is further encapsulated for transmission over the WAN to the appropriate transaction processor. One or more encapsulation operations can be performed. In one embodiment, the received transaction record is transmitted using the Secure Socket Layer protocol (SSL).

Note that an SSL transaction consists of two distinct parts: the key exchange, and the bulk data transfer. The key exchange (SSL handshake protocol) begins with an exchange of messages called the SSL handshake, and during the handshake, the server authenticates itself to the client using public-key encryption techniques. Then, the client and the server create a set of symmetric keys that they use during that session to encrypt and decrypt data and to detect if someone has tampered with the data. The SSL handshake also allows the client to authenticate itself to the server. Thus, during this handshake, the SSL handshake protocol authenticates the server to the client, allows the client and server to negotiate the cipher suite to be used, allows the client and the server to generate symmetric session keys, and establishes the encrypted SSL connection. Once the key exchange is complete, the client and the server use this session key to encrypt all communication between them. They do this encryption with a symmetric key encryption algorithm, such as RC4 or DES. This is the function of the SSL record protocol. Consequently, various communication operations between the MMG and a transaction processor may occur before or during step 630.

Because of the sensitive nature of the data being exchanged as part of the POS terminal transaction, it will typically be encrypted in some way, whether using SSL, HTTPS, or other techniques. In some embodiments, the overhead of establishing an SSL or HTTPS connection is too great, and alternate security measures can be used. For example, some of the SSL management steps can be used (e.g., the process of authentication), while others are not used (e.g., encryption). In still other examples, unencrypted protocols are used, such as HTTP, but the datagrams transmitted are encrypted and included as part of the HTTP URL. Similar approaches can be used for communication between MMGs and MMG network management servers, as will be described below.

Encapsulation of the transaction record will also occur according to a service provider's specific system, such as the VitualNet Internet connectivity service from Vital Processing Services, LLC. In general, for any transaction transmitted over the Internet, typical encapsulation steps will include TCP, IP, and Ethernet encapsulation, in addition to any encryption. Additional system management data, perhaps not directly related to the transaction, can also be added at various stages in the encapsulation process. For example, and MMG can be configured to add an MMG ID (e.g., the MMG's serial number), timestamp information (perhaps from a trusted time source), and the like.

Once the encapsulation process is complete, the transaction record is transmitted to a transaction processor 640. The transaction processor will extract the underlying POS terminal transaction record, perform the necessary processing (e.g., transaction authorization), prepare a response in the record format of the POS terminal, encapsulate it, and return it to the MMG. Upon receiving the response, 650, the MMG can perform certain steps (not shown) such as record keeping, authenticating the response, etc. As with the MMG, the transaction processor can add additional information, e.g., transaction processor ID, timestamp, etc., for use by the MMG. Next, the received response is stripped of its encapsulation (660) to yield a POS terminal record. The record is then transmitted to the POS terminal via the MMG modem interface to the POS terminal, 670. At this point, the POS terminal transaction is complete, and the process ends 680.

Figure 7:
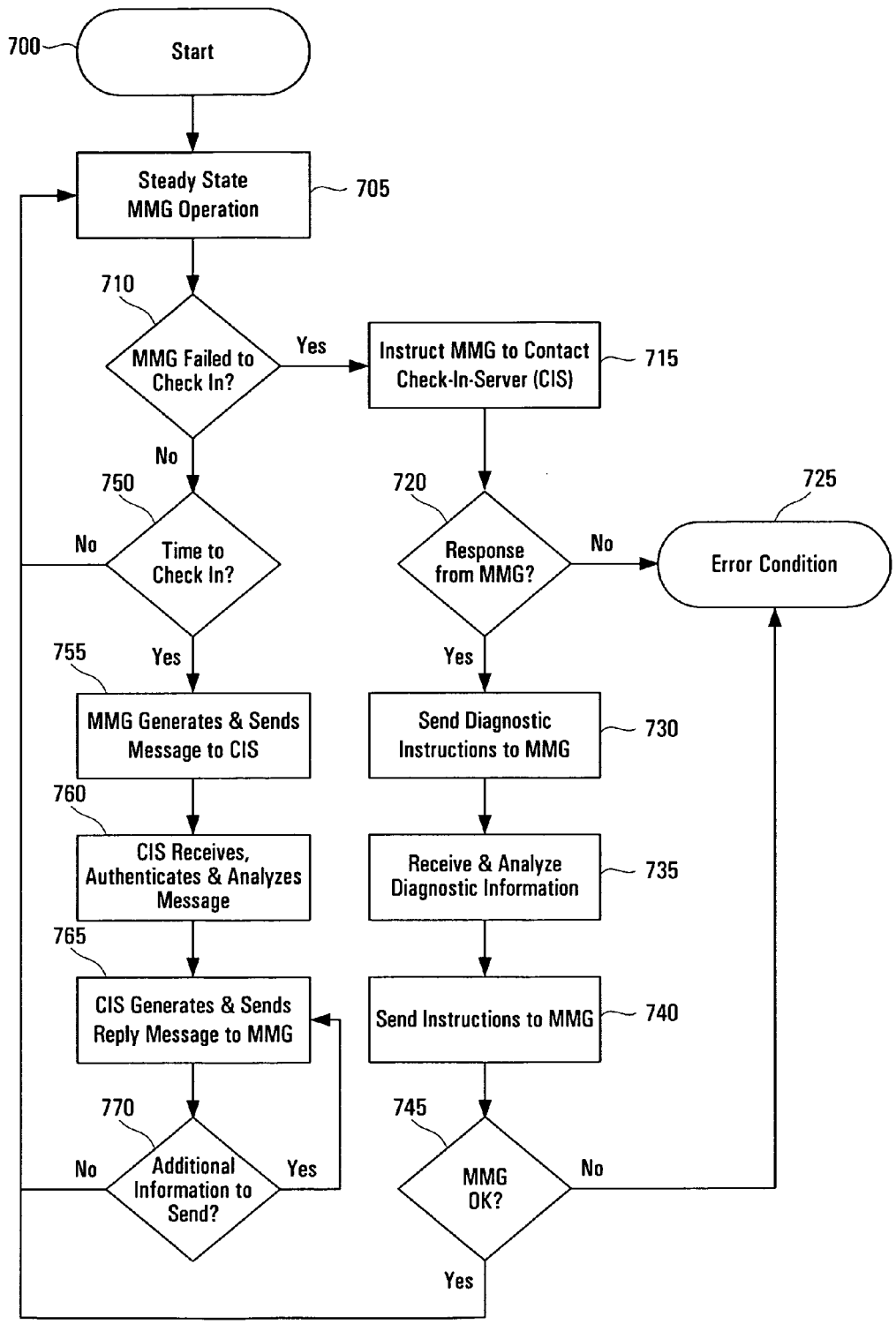
FIG. 7 is a flow chart illustrating an additional aspects of MMG operation in accordance with an embodiment of the present invention.

MMG devices are generally designed to need little monitoring/updating on the part of the merchant. Consequently, various mechanisms exist for external monitoring/updating by a service provider using, for example a server such as MMG network management server 370. FIG. 7 is a flow chart illustrating some examples of a check in process, where MMGs and a corresponding "check in server" (CIS) communicate at regular and/or irregular intervals for the purposes of monitoring, managing, and updating the MMG and its software. Note that the CIS described below can be one or more separate servers, or a server application executing on a server that provides other MMG network management services. Additionally, there is a typically a separate process for initial activation of a device described below in connection with FIG. 8.

Operation begins at 700. In 705, the MMG is operating in steady state, that is, it has been properly installed and is in an operating mode where it can generally operate normally, e.g., process POS terminal transactions, provide other services, etc. The MMG device is configured to check in with at least one CIS at regular and/or irregular intervals. For example, an MMG can be configured to contact a CIS at periodic intervals (e.g., every 5 minutes), less specific intervals (e.g., once in every hour), or at more random intervals. Additionally, in order to better manage many different MMGs, the MMGs can be configured on scattered check in schedules to more evenly distribute the communication load on the CIS. In still another embodiment, MMGs check in at regular intervals, but the time for the first check in operation is at least partially randomized so as to stagger the check in times of different MMGs, even though they operate on the same check in interval. Numerous other check in schemes will be understood by those having ordinary skill in the art.

If an MMG has failed to check in, as determined in 710, the CIS managing check in for the MMG can instruct the MMG to contact the CIS (715). The "timeout" interval used by the CIS to measure when a check in operation is overdue can, like the check in interval itself, be regular, irregular, or based on some other parameter such as number of transactions processed by the MMG, a need to perform a critical update to the MMG, and the like. MMGs are configured to respond to the so-called "phone home" instruction of 715, and so if there is no response from the MMG as determined at 720, an error condition is assumed (725), and various additional steps can be performed. In some embodiments, failure to properly check in can be interpreted as an MMG failure, and operations 715 and 720 are eliminated. Instead, the error condition is indicated, and some alert process is activated. For example, the CIS or a CIS administrator can contact the MMG's merchant directly for further examination of the MMG, a technician can be dispatched to the merchant site, etc. For security purposes, that missing MMG might be designated as compromised, and the CIS can contact other servers to indicate that MMG transactions should not be accepted, at least temporarily. Various other operations can be performed in response to this indication of a presumed error condition. Note that the phone home message can include specific instruction on how to contact the CIS, e.g., a particular network address, or a simple instruction to contact the CIS at an address known to the MMG.

If there is a response from the MMG, as determined in 720, operation transitions to 730 where diagnostic instructions are sent to the MMG. For example, a normal check in message from an MMG might include a variety of pieces of information such as: an MMG ID, a time stamp, status information on internal MMG operations, status information on MMG communications (e.g., with POS terminals and service providers), and the like. The MMG's phone home response can include the same or similar information normally included in the check in process. In other embodiments, the MMG's phone home response includes very limited information or additional information, such as diagnostic information. In cases where the phone home information does include diagnostic information, step 730 can be eliminated. Otherwise, in 730 the CIS forms specific commands to the MMG to supply various types of diagnostic information such as status information, log files, software versions, error reports, etc. In some implementations, the command may simply be to reinitialize the MMG including a re-authentication/activation process. Those commands are sent to the MMG. So-called phone home operation can have additional advantages. For example, it allows MMGs to be more easily managed from behind firewalls. Furthermore, it allows MMGs to have a policy wherein they accept no traffic not initiated by the MMG, thereby making them more difficult to hack.

Note that the communication between MMGs and a CIS (whether normal check in or phone home communication) is typically encrypted in some manner. Possible techniques include SSL, HTTPS, and more simplified techniques. For example, messages can be exchanged by HTTP, where a portion of the URL is encrypted. In one embodiment, the encrypted portion of the URL is a radix-64 encoding of a paired key encrypted message. More specifically, the message can first be compressed using entropy coding such as Lemple-Ziv or RLE encoding. Various other types of compression can be used. Then, the compressed message is encrypted using any of a number of encryption techniques, perhaps based on NIST standards such as the Advanced Encryption Standard (AES) or Data Encryption Standard (DES). A further step can include another radix-64 encoding against a set of characters that are known to be acceptable characters for a URL. Note that some or all of the steps can be performed prior to transporting the message, e.g., compression but no encryption, encryption but no compression, etc., and various related techniques will be well known to those having ordinary skill in the art.

The CIS receives requested diagnostic information from the MMG and analyzes it, 735. Many different results can arise from such analysis. For example, the CIS may determine that all is well with the MMG (perhaps the delay in checking in was because of a pending transaction) and no further steps are required. In other cases, the CIS may be able to diagnose configuration or software problems (e.g., wrong check in interval, wrong check in address, needed software updates), and formulate appropriate messages for the MMG to address the problem. If needed, the CIS will send instructions to the MMG (740) to address the diagnosed problem, to confirm that the MMG is operating normally, or to instruct the MMG to go offline because of serious MMG problems. If it is determined that the MMG is operating in an acceptable manner (745), the process returns to steady state operation 705. Otherwise, an error condition has occurred (725), and is addressed as described above.

Returning to 710, if the MMG has not failed to check in, the next aspect of the check in loop is a determination by the MMG if it is time to check in (750). As noted above, various different schemes can be used to drive the intervals at which the MMG checks in. If it is not time to check in, operation returns to steady state 705 and the check in loop is iterated. If it is time to check in, operation transitions to 755 where the MMG generates and send an appropriate check in message to the CIS. The contents of the check in message can include, for example, MMG ID, timestamp information, diagnostic information, administrative information, status information, and the like. Also as noted above, the check in message can take a variety of different forms and utilize various types of compression, encryption, or other security measures. In some cases (not shown) the designated CIS might not respond (e.g., because of CIS failure, network failure, etc.) In these situations, the MMG can be configured to contact one or more alternate CISs as necessary. A CIS receives, authenticates, and analyzes the check in message as shown in 760. The analysis can include various steps such as: comparing information received with recorded information about the MMG, saving certain information in a database, reviewing diagnostic information and/or log, and the like. In 765, the CIS generates and sends a reply message to the MMG. The response message can itself include various different pieces of information such as: CIS ID, current time (for use by the MMG), success/failure indication regarding the MMG's check in message, an address for the next check in message (e.g., changing the CIS address for administrative, load balancing, or security reasons), updated POS terminal routing information, or other messages such as the phone home message. Similarly, the CIS response can push out to the MMG configuration changes and software updates. If there are additional messages to send (770), such as might be the case for extensive updates, the process loops through step 765. If not, the process returns to steady state operation 705.

As noted above, one or more CIS servers may fail or be otherwise inaccessible to MMGs. In some embodiments, a central server will coordinate distributing information among CISs regarding where various MMGs are and/or which CISs are supporting which MMGs. If a CIS fails, all of the former MMG clients of that server will eventually migrate to another CIS. This migration can occur through the aforementioned process, and/or MMGs can be specifically instructed to check in with a new CIS by the central server or an active CIS. As a particular CIS accepts migrating client MMGs, it can notify the central server that it is getting clients that used to be on a particular CIS, thereby alerting the central server to the possibility that there is some problem with the particular CIS.

Figure 8:
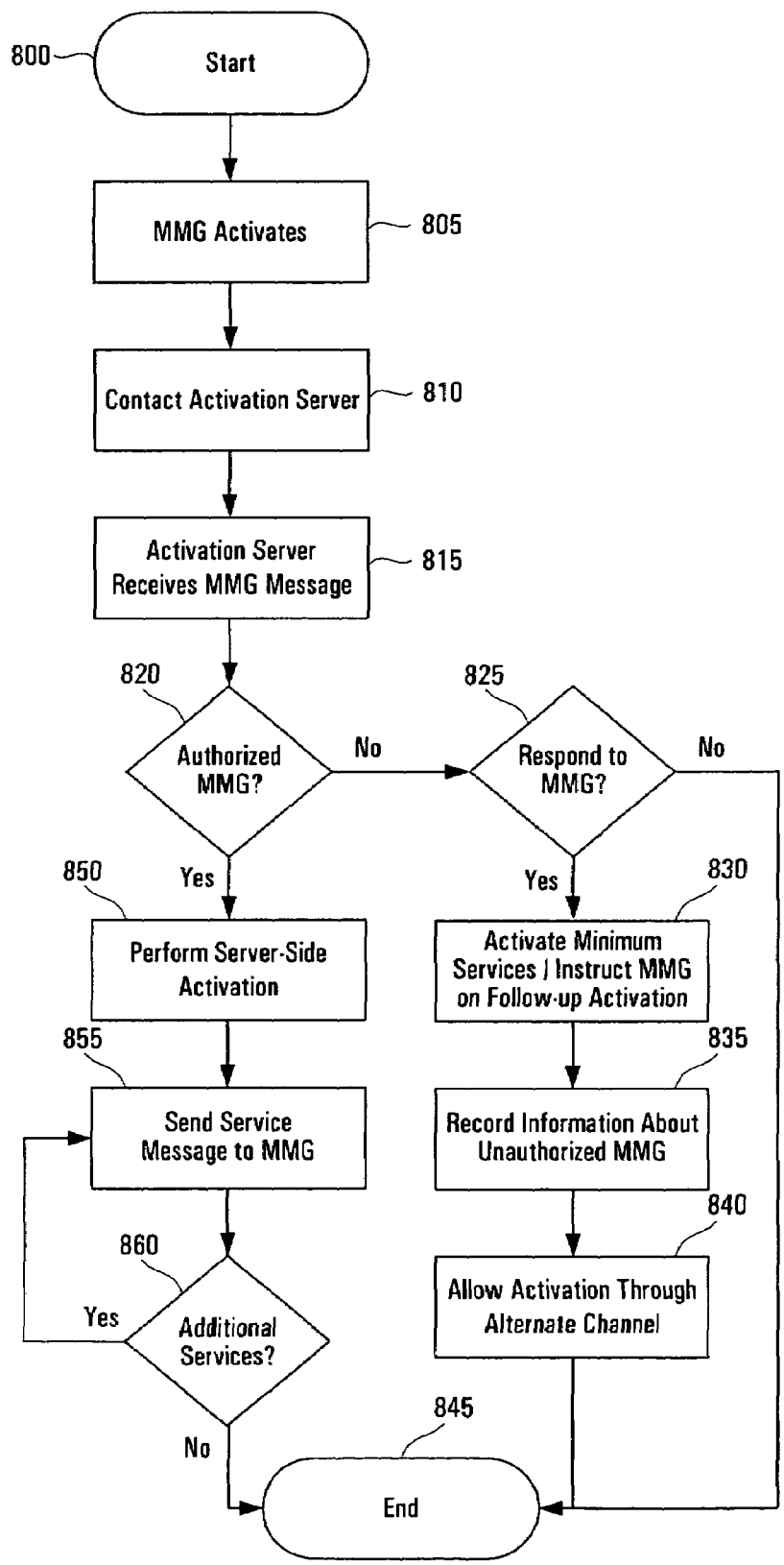
FIG. 8 is a flow chart illustrating still other aspects of MMG operation in accordance with an embodiment of the present invention.

In order to make MMGs more user-friendly, the initial activation of an MMG can be automated as well. FIG. 8 is a flow chart illustrating an example of the initial MMG activation process. Operation begins at 800 where it is assumed that the MMG is installed at a merchant site, and the MMG is connected to a WAN such as the Internet. Depending on implementation, initial activation may or may not require that the POS devices to be used with the MMG are connected to the MMG. The MMG is activated at 805. This typically includes turning the device on and allowing the device to undergo any boot, POST, or similar processes such as determining whether WAN access is via an internal or external broadband modem. Next, the MMG contacts an activation server (810). Like the aforementioned CIS, the activation server can be one or more separate servers, or a server application executing on a server that provides other MMG network management services. In one example, the activation server and CIS functionality are provided by the same server software. The activation message can be presented in a variety of different formats and using a variety of different techniques, as described above. Additionally, the activation message can include various types of information, also as noted above.

The activation server receives the activation message from the MMG (815) and determines whether the MMG that sent the message is authorized to be activated (820). For example, the activation server can keep a list of authorized MMG IDs or serial numbers. When activated, the MMG transmits this information to the activation server, and the activation server compares the received information to its list. In some embodiments, an MMG can be limited to the number of activations or hard resets that occur. This can be useful to prevent unauthorized use or re-selling of an MMG in the aftermarket. If the MMG is not authorized for activation as determined at 820, operation transfers to 825 where the activation server decides whether or not to respond to the MMG. In some embodiments, the activation server can be configured to simply ignore the attempts of unauthorized MMGs to activate. If the activation server is not going to respond to the MMG, the activation process ends, 845. If instead, the activation server is to respond, operation transitions to 830 where some minimum services are activated for the MMG.

In general, the various features enabled at the MMG, and operations allowed in conjunction with various servers (CIS, activation server, transaction processors, etc.) can be described as services. Services may be administrative in nature, e.g., check-in, diagnostic, software update, etc., or more related to the functionality provided to MMG users, e.g., POS transaction services, Internet connectivity services, security services, facsimile service, etc. Services can be deployed and activated with various degrees of granularity, so that, for example, activating minimum services for the MMG allows the MMG user to take additional steps to authorize or re-authorize the MMG. In some embodiments, services are described by tuples in the form: trigger, URL, priority, protocol. The trigger will typically describe what causes the activation of a service. Example triggers include time triggers (e.g., a chron configuration or the like), I/O triggers (e.g., detecting a particular telephone number from a POS terminal), immediate triggers (e.g., activate the service immediately), etc. Some services will have one or more associated URLs. for example, the check in service URL can identify the CIS server to be used. Similarly, the URL for a POS terminal dialed number trigger can identify the transaction processor corresponding to that number dialed by a POS terminal. Services can have specified priorities so that some services take precedence over others. For example, POS terminal transaction services will typically take precedence over other services provided to MMG users such as Internet connectivity for merchant customer use (e.g., a wireless hotspot). Protocol information can provide the MMG with additional information about the protocol to be used for communication related to the described service. Note that this is merely one method of implementing a service model for use with MMG, and numerous other methods will be known to those having ordinary skill in the art.

In addition to, or instead of, the activation of minimum MMG services, the activation server can instruct the MMG or a designated contact (e.g., a business, a person, a salesman, an email address, etc.) to perform one or more follow-up activation steps. Next, the activation server records any relevant information about the unauthorized MMG and its attempt to activate (835). If desirable, the activation server can allow further steps toward activation through an alternate channel (840), such as registration through a website, activation via telephone, or on-site activation. The activation process terminates at 845.

Returning to 820, if it is determined that the MMG is authorized, operation transitions to 850 where server-side activation steps are performed. In short, the activation server is expected to respond to a valid activation request with the information an uninitialized MMG needs to do something useful. In the context of the service model described above, this might be at a minimum a single service such as check in. However, various different operations might be performed by the activation server to complete MMG activation. For example, the activation server can change an indication in a database to reflect that the MMG has been activated. Similarly, the activation server can record relevant information about the activation (e.g., time, software versions, etc.). The activation server may also communicate with other servers, such as the CIS or a transaction processor, to prepare those servers for interaction with the activated MMG. Numerous other activation "housekeeping" processes can be performed and will be known to those having ordinary skill in the art. Additionally, the activation server can determine and/or select various service related information that is to be sent to the MMG. For example, to support POS terminal transactions, the activation server can prepare a service message describing the dialup numbers to be recognized and corresponding network access and protocol information for proper processing of the transactions. Service messages are transmitted in 855, and if there are additional messages to transmit or services to enable, as determined in 860, the process loops through 855 until complete. Additionally, either as part of the service message process or an initial process upon authentication, the activation server will typically send a list of all currently operable CISs. The MMG can then contact each of the CISs (either serially or in parallel) to determine which CISs to use and/or an order of preference. For example, the MMG can ping all of CISs (one or more times) and sort the list by ping delay as measured from the MMG location. It then chooses the "closest" CIS, and sends an interrogative message. The CIS in turn can respond in various ways, e.g., and indication that check in is allowed, an indication that the CIS is too busy for that MMG, etc. Depending on the result, the MMG may attempt to check in with the next closest CIS on its list.

In a related process, previously authenticated MMGs can be instructed to re-authenticate (e.g., proceed through some or all of the operations in FIG. 8 again), and/or to obtain a new or updated list of CISs for use and proximity evaluation.

The flow charts of FIGS. 5-8 illustrate some of the many operational examples of MMG use disclosed in the present application. Those having ordinary skill in the art will readily recognize that certain steps or operations illustrated in FIGS. 5-8 can be eliminated or taken in an alternate order. Moreover, the methods described throughout this application (including FIGS. 5-8) are typically implemented (in whole or in part) as one or more software programs encoded in a computer readable medium as instructions executable on a processor. The computer readable medium can be any one of an electronic storage medium, a magnetic storage medium, an optical storage medium, and a communications medium conveying signals encoding the instructions. Separate instances of these programs can be executed on separate devices in keeping with the methods described above. Thus, although certain steps have been described as being performed by certain devices, software programs, processes, or entities, this need not be the case and a variety of alternative implementations will be understood by those having ordinary skill in the art.

Figure 9:
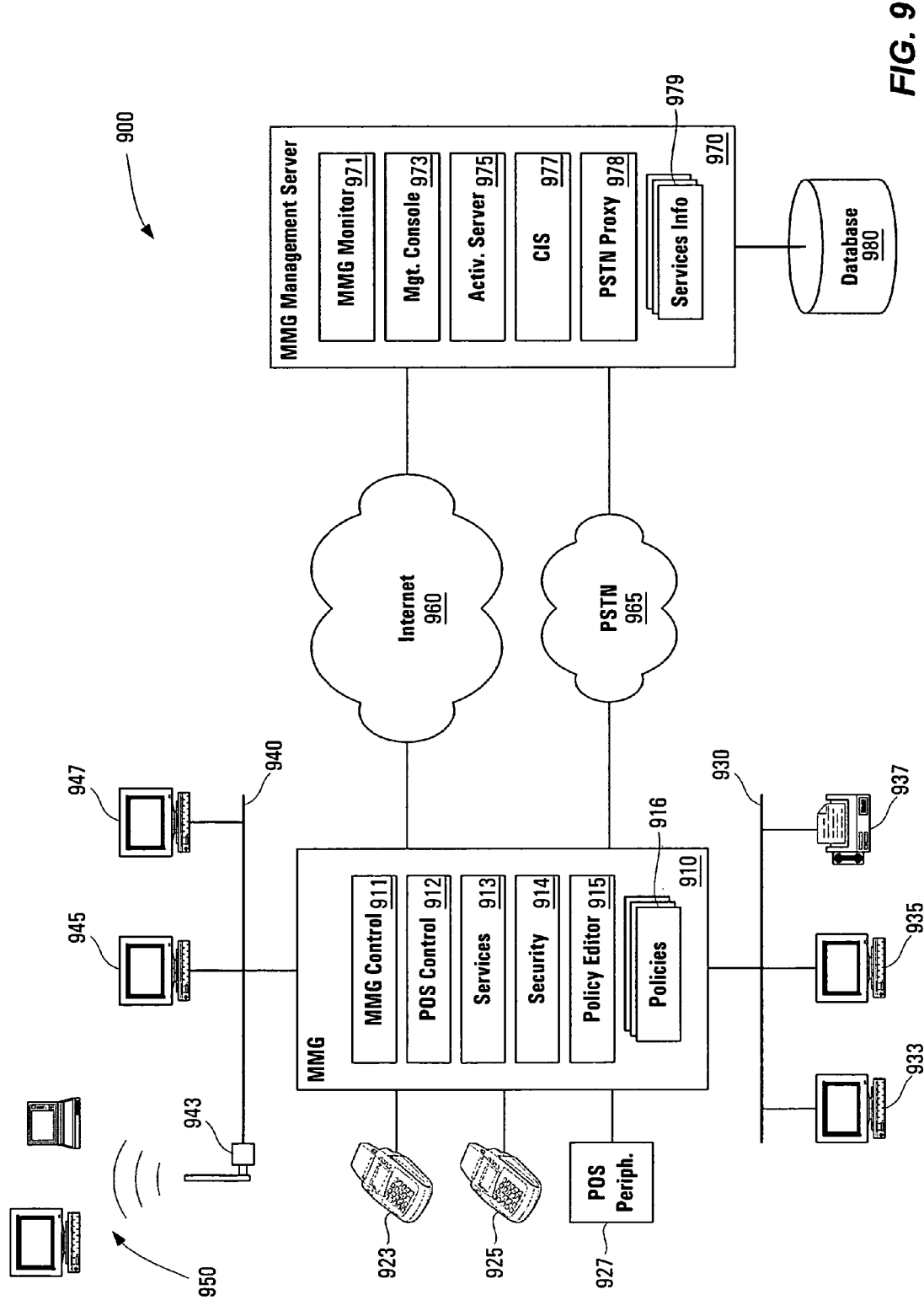
FIG. 9 is a simplified block diagram illustrating some hardware and software components in accordance with an embodiment of the present invention.

FIG. 9 is a simplified block diagram illustrating some hardware and software components in accordance with various embodiments of the present invention. MMG system 900 includes both an MMG 910, and an MMG management server 970. The two devices are interconnected by a network, typically a WAN such as the Internet (960). MMG 910 can also be coupled to PSTN 965 to provide, for example, fail safe access to certain services. MMG 910 has multiple POS terminal devices (923 and 925) connected to it, as well as one or more POS terminal peripherals 927 (e.g., PIN keypads, printers, check readers, smart card readers, bar code readers, RFID readers, etc.).

MMG 900 is also configured to provide WAN access to one or more LANs 930 and 940. In the example illustrated, LAN 930 is a "back office" network, i.e., it is designed to be accessible only by merchant site computers and devices, and typically only by merchant personnel. Thus, computer systems 933 and 935 can be merchant computer systems (e.g., PCs) used for normal business tasks, or other specialized appliances such as electronic advertising displays, merchandising systems (e.g., vending machines, electronic fuel dispensing devices, etc.). MMG 910 conveniently provides Internet access to computer systems 933 and 935. In this capacity, MMG 910 can operate as a network hub, switch or router. Other devices can also be coupled to LAN 930, such as printers, storage devices, servers, VoIP gateways, RFID readers, and fax machines (937). In other embodiments, some or all of these other devices can be connected directly to MMG 910.

Similarly, MMG 910 can allow the merchant to provide customers with WAN access via public LAN 940. Computer systems 945 and 947 are shown wired to MMG 940 (either directly, as shown, or via a hub or switch). Still other computing devices 950 can access the LAN wirelessly using signals transmitted and received via antenna 943. In some implementations, only one or the other of wired and wireless access is provided to merchant customers. Note also that wired access can be provided via one or more network ports on MMG 940, while wireless access can be provided by an expansion card such as an IEEE 802.11a/b/g PCMCIA or Mini-PCI card. Consequently, antenna 943 can be part of the expansion card, or a separate antenna connected to an appropriate MMG or expansion card interface.

MMG 910 includes various programs, software modules, and data in order to provide services to merchants. Note that the various software entities (e.g., 911-916 and 971-979) are shown as separate software modules. These modules, and indeed any of the software modules described herein, can be variously combined into single software modules, implemented on separate computer systems, executed as separate threads on a single computer system, etc. Thus, the organization of the functional blocks and the hardware on which corresponding software is executed can be implemented in a variety of different ways as is well known in the art. For example, MMG control software 911 and POS terminal control software 912 can be combined so that both functions are performed by a single program. In general, two or more of the various modules can execute on the same computer system, or on some combination of separate computer systems as desired. The types of computer systems on which such software can be implemented are described below in conjunction with FIG. 10.

MMG control software 911 typically includes basic software for operating the MMG such as an operating system, broadband modem software, network protocol stacks, device drivers, etc. POS control software 912 is software specifically designed to redirect incoming POS terminal transactions to the appropriate service provider, and direct responses back to the POS terminal. As such, POS control 912 is an example of the services described above. Software for various other services (913) is also typically executed on MMG 910. Examples of other services include check in and activation related services, VPN or managed network services, customer portal services for wireless or wired customer access to the Internet, RFID services, facsimile services, in-store advertising services (e.g., the MMG drives one or more video displays with advertising or other content), etc.

Security software 914 is also included. Firewall software, encryption software, SSL/HTTPS software, etc., are all examples of the sort of security software that can be used with MMG 910. Security module 914 can be used to arbitrate user access to MMG functionality either at the merchant, merchant customer, or administrator level. Security module 914 can include various client/server security features (user authentication, encryption, VPN, firewall, etc.) as well as specialized security associated with the MMG and POS terminal usage.

Because the MMG provides a reasonable amount of computing power, various interfaces, and Internet access, numerous services to merchants and their customers can be provided. For merchants, the convenient ability to offer a wireless hotspot to customers is a useful feature of MMG 910. Thus, MMG 910 will typically provide portal software (e.g., a very simple web server or splash screen service) to provide basic information to users accessing the a WAN via the MMG. In some embodiments, a hotspot access splash screen, e.g., a web page initially served to users who connect their computer, PDA, cell phone, etc., will be provided by a portal service. The splash screen can include information about the merchant, information about the terms of use of the service, information about service features (e.g., availability, cost, etc.), and other information such as news, weather, advertisements, etc. Merchants will typically access a splash screen upload page or tool, so that they can upload graphics, select color schemes, edit content, and define acceptable use policies ("terms of use") for network access. As part of this functionality, a preview of the splash screen can also be provided. Note also that included web server functionality in MMG 910 can also be used to provide a management console for the MMG. Thus, a merchant, service provider, or technician can access one or more secure web pages that provide information about the MMG and a convenient (and familiar) interface for configuring the device.

Where MMG 910 provides some manner of web server, a merchant or user accesses documents using a web browser (a computer program designed to display markup language documents and communicate with web servers) running on client computer system (not explicitly shown), or in some cases running on MMG 910 itself. The document can be selected using a hypertext link within another document being viewed with the web browser, or by explicitly specifying the data view document's URL. The web browser then issues a hypertext transfer protocol (HTTP) request for the requested document to the web server identified by the requested document's URL. In response, the designated web server returns the requested document to the web browser, also using the HTTP. In other embodiments, a user executes a specialized applet, e.g., a Java applet operating in the context of a browser. HTML or XML browsers and/or applet runtime environments are used to display the documents and to generally interact with server. The server and the client are typically coupled to each other through a communications network.

Because there are various different constraints a merchant might want to impose on wireless network access and usage, MMG 910 also includes policy editor software 915 and one or more policies 916. In addition to managing access and usage policies, the portal or simple web serving functionality can be integrated into policy editor 915. Whether or not the policy editor allows configuration of one or more splash screens, it will typically provide a simple graphical user interface by which merchants can select and configure policies. Although, specialized interfaces can be used, a convenient form in which to present policy editor functionality is via one or more web pages having various user interface elements such as buttons, pull down menus, slide-bars, text fields, file selection tools, graphics, and the like.

Thus, the policy editor might be used to configure a wireless network access splash screen, a firewall, etc. In some embodiments, policy editor 915 will include multiple usage policy definitions from which a merchant can select. The simplest policy is no policy at all. Users would be allowed unrestricted access to the network. Although such an option might be presented to a merchant in some embodiments, other embodiments might have some sort of minimum security policy, or at least recommend to the merchant that a "no policy" policy not be used. Network access can be limited by time of day, day of week, type of user, amount of access at any one time, number of users, in-store events, customer turnover information, sales information, network address or domain (e.g., restrict access to competitor's websites or objectionable content), bandwidth consumption, etc., or some combination thereof. In some cases, so-called "walled gardens" can be implemented, where only a certain set of URLs can be accessed, possibly until some condition is met, e.g., purchasing service, receiving a token, etc. Messages can be defined for display to users who attempt to access the network in a way contrary to the access restrictions. For example, a user may be redirected from a competitor's site to the merchant's site. In other examples, a message describing the nature of the restriction is shown. Access can also be limited by password or other tokens that remain fixed or change on some schedule. Merchants can also limit access at some or all times to customers who specifically pay for access. Policy editor 915 allows a merchant to select specific attributes, and/or pick predefined policies for use unchanged or modified. For example, policies 916 can be differentiated based on type of business, e.g., a full service restaurant policy, a fast food restaurant policy, a convenience store policy, a coffee shop policy, a book store policy, a medical office policy, etc. Once selected, a merchant can make changes to a pre-selected policy and save those changes as a user defined policy. Policy editor 915 can also suggest a policy based on certain information provided by the merchant, such as type of business, size of business, etc.

Although policy editor 915 is described with respect to merchant customer network access policies, similar policies can be used for to manage customer or employee access to other services, such as facsimile service, VoIP service, RFID reading service, media content served locally (e.g., music and movies provided by a local media server), and the like. Moreover, policy editor 915 need not be present on MMG 910. Policy editor 915 provides configuration information used by MMG 910 and its various programs and services. As such, policy editor 915 can exist on another device, such as MMG management server 970 or another web server. A merchant, technician, or administrator would simply access the policy editor wherever it is, and obtain requisite configuration information for the MMG. For example, a merchant could access the policy editor over the web, and once a policy is selected, an appropriate server (e.g., the policy editor server itself, a CIS, an activation server, etc.) can send the configuration information to the MMG.

System 900 also illustrates some of the software components of MMG management server 970. MMG management server 970 includes management console software 971, transaction server management software 973, activation server 975, CIS 977, PSTN proxy 978, and service information 979. As previously noted, one or more of these components can be combined, or instantiated separately on other server devices. Management console software 971 provides an administrator of MMG management server 970 ready access to relevant information regarding MMGs managed by server 970 as well as information about the various service provider transaction processors with which network MMG communicate. Information provided via console 971, typically comes from the various server components (973-977), MMGs themselves, and database 980. For MMG management servers that manage multiple MMGs and multiple networks of MMGs, console 971 provides a means for organizing and reporting the MMG network information and configuring network parameters. In one example, console 971 provides "dashboard" type information, giving the viewer quick access to critical system information such as, the number of MMGs operating normally, the number of MMGs late for check in, MMGs awaiting activation, transaction volume, error conditions, and the like. Management console 971 can also provide a convenient interface into database 980 for troubleshooting specific MMG problems, performing manual MMG activation, and providing merchants with help desk features. Management console 971 can be implemented in a variety of different ways, but will typically provide a user with textual, command line, and/or GUI interfaces. Moreover, management console functionality can be implemented using a web interface as described above. Administrative users can access management console 971 directly from server 970, or via a client computer system (not shown) accessing the server through a direct or network connection.

Transaction server management software 973 provides services specific to managing the relationship with various service providers and/or financial institutions used to perform the transactions initiated by POS terminal devices. For example, service providers may require regular update information regarding the MMGs that are authorized to source transactions targeting the provider. Similarly, MMG management server administrators may wish to receive information about transactions from "in-network" MMGs, and this information can be provided by the service providers. Various other uses for transaction server management software 973 will be known to those having ordinary skill in the art.

Activation server 975 and CIS 977 generally operate in the manner described above with respect to FIGS. 7 and 8. Services information 979 includes various pieces of information (either separately as shown, or stored in database 980) to support the various services activated on an MMG. As new services are made available, and old services updated or removed, services information 979 is revised.

MMG management server 970 also includes PSTN proxy 978 for providing connection to services that, for example, can only be provided to MMGs via PSTN 965. PSTN proxy 978 includes software and necessary hardware (e.g., a modem, phone line switch, etc.) to convert certain transactions and communication from the MMG back into conventional PSTN transaction. For example, a merchant might have certain legacy devices or support certain transactions which MMG management server 970 cannot otherwise support via relationships with various service providers. However, it is more convenient for the merchant (and the MMG provider) to provide a "complete" solution. So, instead of not allowing the merchant to use the legacy hardware or perform unsupported transactions, PSTN proxy 978 allows the transaction to proceed as it would have proceeded had no MMG been used. MMG management server 970 can thus provide support for all PSTN related services, whether or not the system is specifically configured for all types of services. Moreover, this can be done in a way that is essentially transparent (except perhaps for some increased transaction delay) to merchants. PSTN proxy 978 will typically include hardware and PSTN access for multiple phone lines so that it can service the needs of many MMGs. As noted above, PSTN proxy 978 need not be implemented as a part of server 970, and thus could be a separate server that is part of system 900.

Database 980 provides a uniform, secure, and resilient data store for various different types of information used in system 900. Database 980 is typically implemented using a database management system (DBMS). Examples of such DBMSs include IBM's DB2, Oracle Corporation's database management systems, Microsoft SQL Server, Sybase IQ, MySQL, PosgreSQL, and the like. Database 980 can be a relational or non-relational database. Although schematically illustrated as a separate program/entity, some implementations of database 980 can be integrated with other applications, such as software shown in server 970. In such embodiments, database 980 might not be considered to be a "traditional" database, but rather some other type of data store. Nevertheless, as used in the present application, "database" should be given its broadest meaning.

Figure 10:
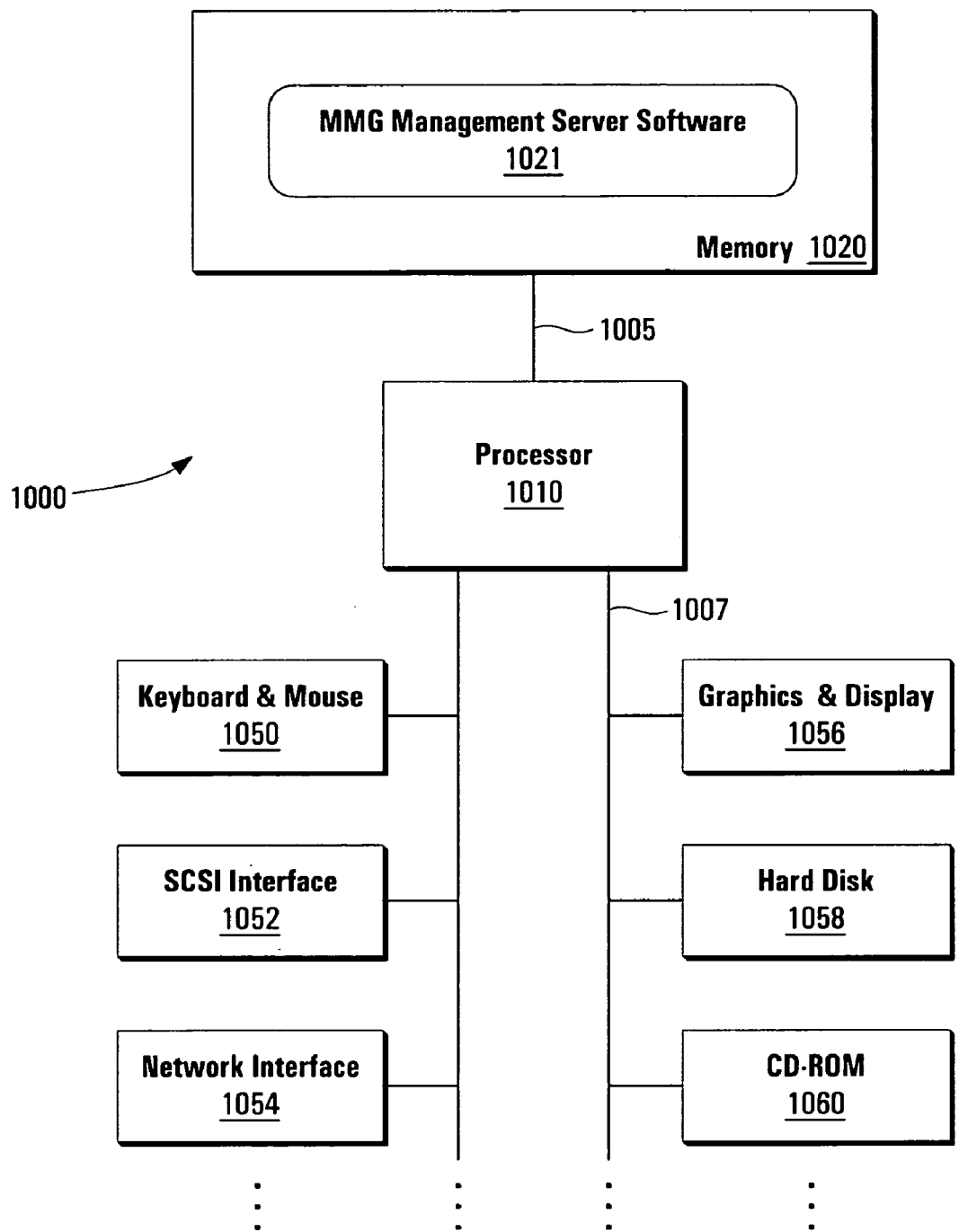
FIG. 10 is a simplified block diagram of a computer system for implementing the techniques of the present invention.

FIG. 10 illustrates a block diagram of a computer system 1000 for implementing the techniques of the present invention. For example, computer system 1000 can be an embodiment of one of the previously described servers or client computer systems. Computer system 1000 includes a processor 1010 and a memory 1020 coupled together by communications bus 1005. Processor 1010 can be a single processor or a number of individual processors working together. Memory 1020 is typically random access memory (RAM), or some other dynamic storage device, and is capable of storing instructions to be executed by the processor, e.g., software 1021. Memory 1020 is also used for storing temporary variables or other intermediate information during the execution of instructions by the processor 1010.

Those having ordinary skill in the art will readily recognize that the techniques and methods discussed below can be implemented in software using a variety of computer languages, including, for example, computer languages such as C, C++, C#, Java, JavaScript, VBScript, JScript, PHP, Perl, SQL; development environments/tools such as Active Server Pages (ASP), JavaServer Pages (JSP), and ColdFusion; and interface tools such as the Common Gateway Interface (CGI). Additionally, software 1021 can be provided to the computer system via a variety of computer readable media including electronic media (e.g., flash memory), magnetic storage media (e.g., hard disk 1058, a floppy disk, etc.), optical storage media (e.g., CD-ROM 1060), and communications media conveying signals encoding the instructions (e.g., via a network coupled to network interface 1054).

Computer system 1000 also includes devices such as keyboard & mouse 1050, SCSI interface 1052, network interface 1054, graphics & display 1056, hard disk 1058, and CD-ROM 1060, all of which are coupled to processor 1010 by communications bus 1007. It will be apparent to those having ordinary skill in the art that computer system 1000 can also include numerous elements not shown in the figure, such as additional storage devices, communications devices, input devices, and output devices, as illustrated by the ellipsis shown.

Although the present invention has been described with respect to specific embodiments thereof, various changes and modifications may be suggested to one skilled in the art and it is intended that the present invention encompass such changes and modifications as fall within the scope of the appended claims.

What is claimed is:

1. A method comprising:
receiving a first message from a point-of-sale terminal, wherein the receiving the first message comprises intercepting the first message as the first message is being sent from the point-of-sale terminal, and wherein the first message is formatted for transmission via a public switched telephone network (PSTN);
preparing a second message based at least in part on the first message;
transmitting the second message over a wide area network;
providing a client of a merchant with access to the wide area network, wherein the receiving, the preparing, the transmitting, and the providing are performed by a merchant gateway device located on a premises operated by the merchant, and wherein the client is one of a device operated by a customer of the merchant and a device operated by the merchant; and
converting the second message into a third message; and
sending the third message via the PSTN, wherein the receiving, the preparing, and the transmitting are performed by the merchant gateway device, and wherein the converting and the sending are performed by a PSTN proxy server coupled to the merchant gateway device by the wide area network.

2. The method of claim 1 wherein the transmitting the second message over a wide area network further comprises:

transmitting the second message to at least one of a service provider computing device and a transaction server.

3. The method of claim 1 wherein the first message describes a transaction to be authorized.

4. The method of claim 3 wherein the transaction to be authorized is a financial transaction.

5. The method of claim 3 wherein the first message at least partially conforms to at least one of International Organization for Standardization (ISO)-8583, Visa International Service Association (VISA) I, and VISA II protocols.

6. The method of claim 1 wherein the preparing a second message based at least in part on the first message further comprises at least one of:
encapsulating the first message;
encrypting at least a portion of the first message; and
extracting data from the first message.

7. The method of claim 1 wherein the second message includes at least one of: a transmission device identifier, a timestamp, and a destination address for transmission of the second message.

8. The method of claim 1 wherein the transmitting the second message over a wide area network further comprises:
transmitting the second message over the wide area network according to a security protocol.

9. The method of claim 1 further comprising:
detecting an off-hook signal generated by the point-of-sale terminal.

10. The method of claim 1 further comprising:
generating a dial tone signal for detection by the point-of-sale terminal.

11. The method of claim 1 further comprising:
detecting a dual-tone multi-frequency (DTMF) signal transmitted by the point-of-sale terminal.

12. The method of claim 11 further comprising:
decoding at least a portion of the DTMF signal transmitted by the point-of-sale terminal;
comparing the decoded at least a portion of the DTMF signal with a plurality of values; and
selecting a network destination for use in the transmitting the second message over the wide area network.

13. The method of claim 1 wherein:
the first message is received via a first interface; and
the second message is transmitted via a second interface.

14. The method of claim 1 further comprising:
performing a modem training sequence in conjunction with the point-of-sale terminal.

15. The method of claim 1 further comprising:
receiving a response to the second message via the wide area network;
preparing a third message based at least in part on the response to the second message; and
transmitting the third message to the point-of-sale terminal.

16. The method of claim 1, further comprising:
contacting a check in server via the wide area network, wherein the receiving, the preparing, the transmitting, and the contacting are performed by a merchant gateway device, and wherein the contacting comprises sending status information to the check in server.

17. The method of claim 16, wherein the status information comprises diagnostic information associated with one or more devices connected to the merchant gateway device.

18. The method of claim 16, further comprising repeating the contacting at least once during each of a plurality of intervals.

19. The method of claim 16, further comprising receiving, from the check in server, at least one of: a configuration change and a software update.

20. The method of claim 16, further comprising:
coordinating distribution of information among a plurality of check in servers, wherein the coordinating is performed by the check in server, and wherein the information is associated with the merchant gateway device.

21. The method of claim 1, wherein the providing access to the wide area network comprises providing Internet access to the client of the merchant.

22. The method of claim 21, further comprising:
providing a user interface to the merchant; and
receiving information specifying a policy via the user interface, wherein the policy indicates one or more limitations on the Internet access provided to the client of the merchant.

23. An apparatus comprising:
a memory storing program instructions;
a processor coupled to the memory and configured to execute the program instructions stored in the memory;
a first communications interface coupled to the processor and configured to interface with a point-of-sale terminal; and
a second communications interface coupled to the processor and configured to interface with a wide area network,
wherein the first communications interface is configured to intercept a first message being sent from the point-of-sale terminal,
wherein the first message is formatted for transmission via a public switched telephone network (PSTN),
wherein the second communications interface is configured to transmit a second message over a wide area network,
wherein the second message is based, at least in part, on the first message,
wherein the program instructions are executable by the processor to provide a client of a merchant with access to the wide area network, wherein the client is one of a device operated by a customer of the merchant and a device operated by the merchant,
wherein the second message is converted into a third message by a PSTN proxy server coupled to the second communications interface by the wide area network, and
wherein the third message is sent via the PSTN by the PSTN proxy server.

24. The apparatus of claim 23 wherein the first communications interface is a PSTN capable modem.

25. The apparatus of claim 23 further comprising:
at least another communications interface coupled to the processor and configured to interface with a point-of-sale terminal, wherein the at least another communications interface further comprises a serial interface.

26. The apparatus of claim 25 wherein the at least another communications interface includes at least one of a PSTN capable modem, a recommended standard (RS) 232 interface, an RS485 interface, and an universal serial bus (USB) interface.

27. The apparatus of claim 23 further comprising:
a serial controller coupled between the processor and the first communications interface.

28. The apparatus of claim 23 wherein the second communications interface is one of an Ethernet interface and a broadband interface.

29. The apparatus of claim 23 wherein the second communications interface further comprises an analog front end circuit.

30. The apparatus of claim 29 wherein the analog front end circuit operates in conjunction with the processor to provide broadband modem functionality.

31. The apparatus of claim 23 further comprising:
a third communications interface coupled to the processor and configured to interface with a local area network.

32. The apparatus of claim 23 further comprising:
an expansion card interface coupled to the processor.

33. The apparatus of claim 32 further comprising:
an expansion card coupled to the expansion card interface, wherein the expansion card further comprises at least one of: a flash memory card, a personal computer manufacturer interface adapter (PCMCIA) card, a Mini peripheral component interconnect (PCI) card, and a wireless network access card.

34. The apparatus of claim 23 wherein memory further comprises at least one of a volatile memory and a non-volatile memory.

35. The apparatus of claim 23 wherein the processor further comprises at least one of a general purpose microprocessor, an embedded processor, a network processor, a system-on-a-chip (SoC) device, an application specific integrated circuit (ASIC), and a field programmable gate array (FPGA).

36. The apparatus of claim 23 further comprising:
a switch circuit configured to connect signals received on the first communications interface to a telephone network coupled at least one of the second communications interface and a third communications interface.

37. The method of claim 1, wherein the point-of-sale terminal is configured to perform at least one of: information gathering and information reporting.

38. A method comprising:
receiving a first message from a point-of-sale terminal, wherein the receiving the first message comprises intercepting the first message as the first message is being sent from the point-of-sale terminal, and wherein the first message is formatted for transmission via a public switched telephone network (PSTN);
preparing a second message based at least in part on the first message;
transmitting the second message over a wide area network;
converting the second message into a third message; and
sending the third message via the PSTN, wherein the receiving, the preparing, and the transmitting are performed by a merchant gateway device, and wherein the converting and the sending are performed by a PSTN proxy server coupled to the merchant gateway device by the wide area network; and
contacting a check in server via the wide area network, wherein the receiving, the preparing, the transmitting, and the contacting are performed by the merchant gateway device, and wherein the contacting comprises sending status information to the check in server.

39. A method comprising:
receiving a first message from a point-of-sale terminal, wherein the receiving the first message comprises intercepting the first message as the first message is being sent from the point-of-sale terminal, and wherein the first message is formatted for transmission via a public switched telephone network (PSTN);
preparing a second message based at least in part on the first message;
transmitting the second message over a wide area network;
providing a client of a merchant with access to the wide area network, wherein the receiving, the preparing, the transmitting, and the providing are performed by a merchant gateway device located on a premises operated by the merchant, and wherein the client is one of a device operated by a customer of the merchant and a device operated by the merchant;
sending communications generated by a peripheral device to a PSTN proxy server via the wide area network, wherein the sending is performed by the merchant gateway device; and
converting one of the communications received from the merchant gateway device to a PSTN communication, wherein the converting is performed by the PSTN proxy server.

40. A computer readable storage medium encoding program instructions executable to implement a merchant gateway device, wherein the merchant gateway device is configured to:
intercept a first message as the first message is being sent from a point-of-sale terminal, wherein the first message is formatted for transmission via a public switched telephone network (PSTN);
prepare a second message based at least in part on the first message;
initiate transmission of the second message over a wide area network; and
provide a client of a merchant with access to the wide area network, wherein the merchant gateway device is configured to be located on a premises operated by the merchant, and wherein the client is one of a device operated by a customer of the merchant and a device operated by the merchant;
wherein the second message is converted into a third message by a PSTN proxy server coupled to the merchant gateway device by the wide area network; and
wherein the third message is sent via the PSTN by the PSTN proxy server.

* * * * *